UNITED STATES PATENT OFFICE.

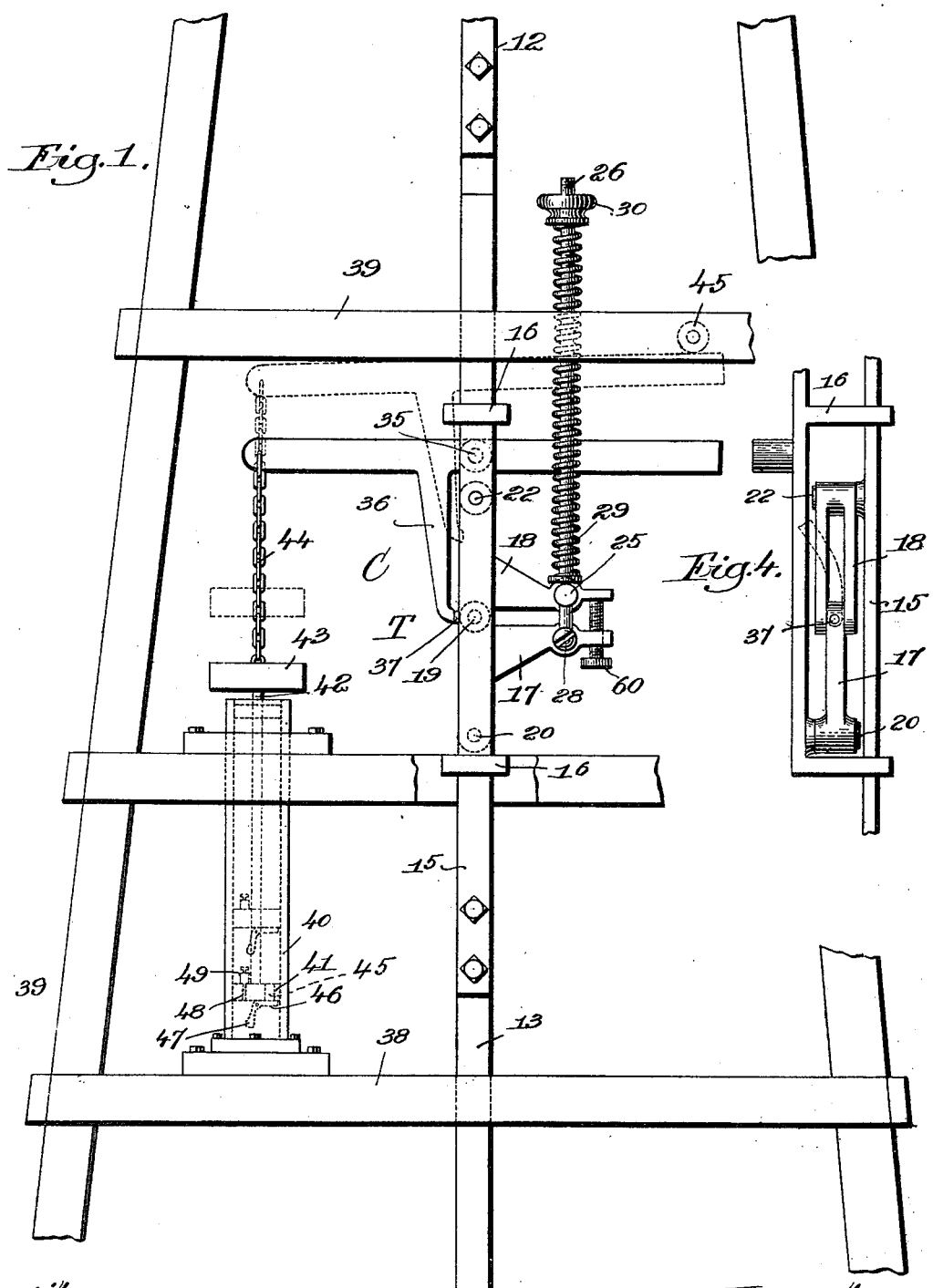

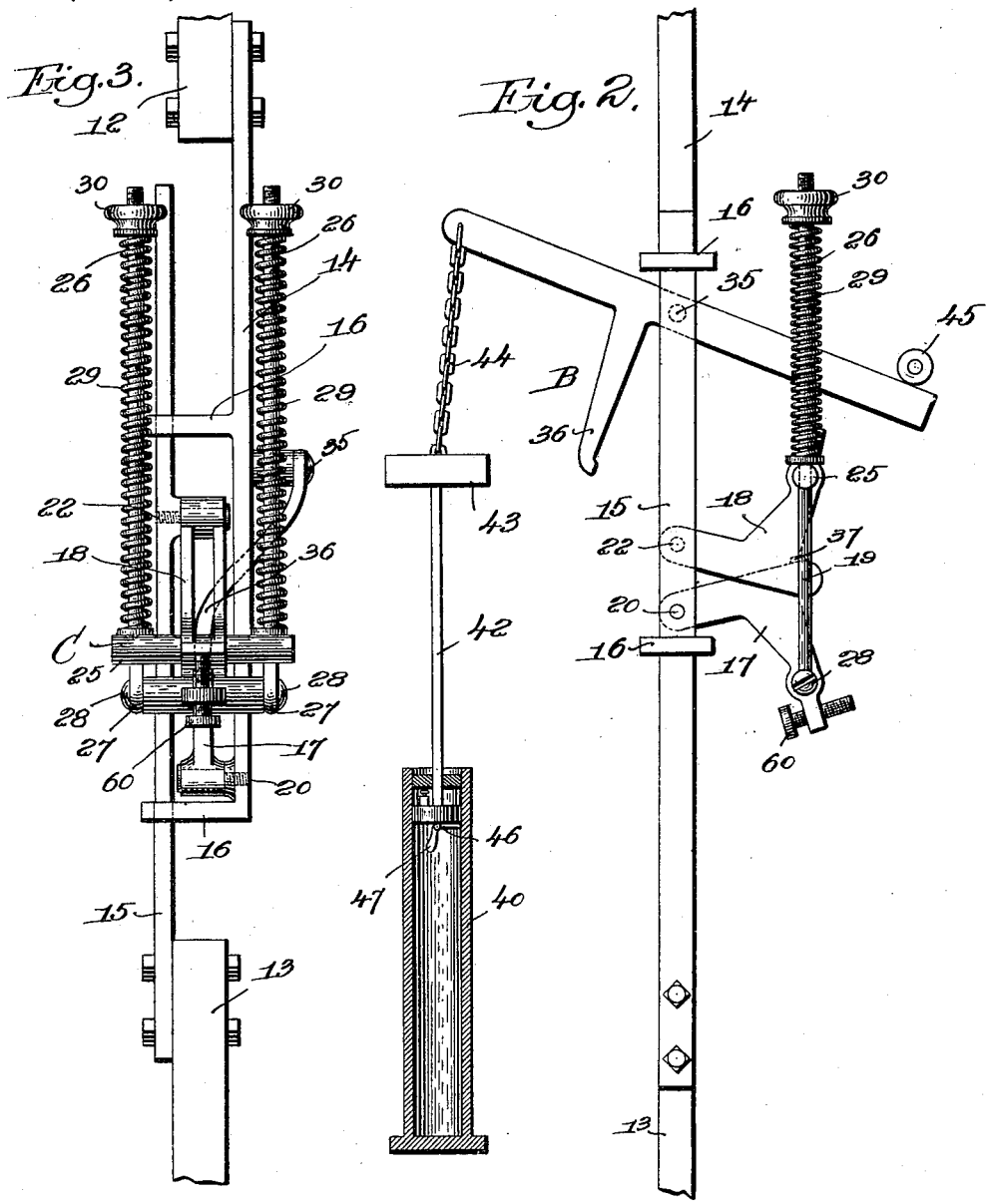

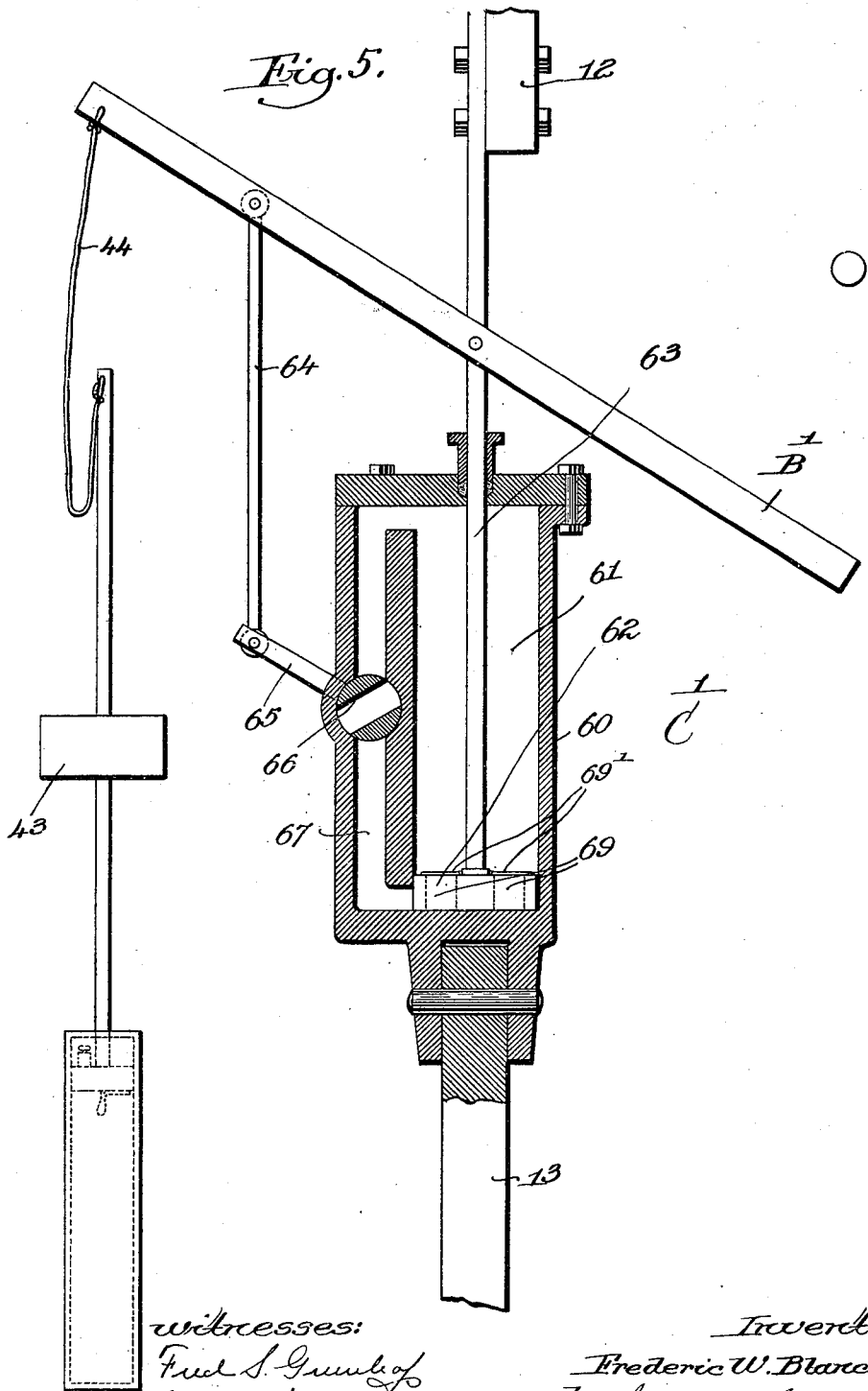

FREDERIC W. BLANCHARD, OF HOLBROOK, MASSACHUSETTS.

POWER-TRANSMITTING MEMBER.

SPECIFICATION forming part of Letters Patent No. 632,168, dated August 29, 1899.

Application filed June 21, 1899. Serial No. 721,339. (No model.)

*To all whom it may concern:*

Be it known that I, FREDERIC W. BLANCHARD, of Holbrook, county of Norfolk, State of Massachusetts, have invented an Improvement in Power-Transmitting Members, of which the following description, in connection with the accompanying drawings, is a specification, like letters and numerals on the drawings representing like parts.

This invention relates to a power-transmitting member capable of application to many different kinds of apparatus where the power and resistance or load vary; and the object of the invention is to provide a simple device of the character specified which is automatically regulable or self-adjustive to either the power applied or the load acted upon by a motor.

While my improved appliance may be employed in many different ways, I have represented in the drawings and will hereinafter describe it as operative with a pump-actuated windmill, as it is of peculiar utility in this connection, where, as is well known, the velocity of the wind frequently and suddenly changes in the course of a very short period; but even though this variation takes place it can in no way affect the action of either the motor or the pump, as the pump-rod is in the case pointed out rendered automatically ineffective to a greater or less extent when the velocity of the wind goes below a predetermined standard.

In the drawings, wherein my improved connecting member is illustrated in its preferred embodiment, Figure 1 is a side elevation of a portion of a windmill-tower provided with said improved power-transmitting member and showing the parts in their lowermost position. Fig. 2 is a substantially similar view with certain of the parts in their upper positions and the connecting member between the rods in its shifted position. Fig. 3 is a front elevation of the same. Fig. 4 is a rear elevation of the toggle-breaker, and Fig. 5 is a central vertical section showing a modified form of device.

My improved power-transmitting member in the form thereof represented in the accompanying drawings includes in its organization two shiftably-connected members and means for automatically causing one of said members to shift relatively to the other.

As usually constructed, a windmill, say, of eight feet in diameter will operate a two-and-one-half-inch pump, elevating water fifty feet, provided the velocity of the wind is at the rate of fifteen miles an hour. If, however, the wind goes below this speed, the mill not having power enough to operate, the pump will stop; but by employing a power-transmitting member such as that herein described between the mill and the pump the pump-rod will be rendered automatically ineffective to an extent corresponding to the form of the mill, so that the load is not suspended from the said mill, and in such a case as this the wind-wheel can continue to rotate so long as there is sufficient breeze to cause such an operation; but the wheel or mill is not operating the pump.

The connecting member in the form thereof represented in Figs. 1 to 4, inclusive, is denoted in a general way by C, and it involves what might be termed a "power-rod" 12 and a "pump-rod" 13, the first-mentioned rod being connected with a motor such as a windmill, while the rod 13 is connected with a pump-piston, and said rods, which are usually of wood, have the metal extensions 14 and 15 disposed in vertical parallelism, the rod 14 being provided with the lugs or ears 16, disposed at suitable points in its length, and which are in the nature of guides having apertures near their ends to receive the extension 15, and the lugs or ears 16 being slidable upon the complemental part 15 when the connecting member between the rods is operated.

The means illustrated in the four views in question for connecting the two rods, whereby one of them can shift relatively to the other, is in the nature of a toggle T, the respective members of which are denoted by 17 and 18, they being each in the form of angular pieces or plates and being united at their angles preferably by a pivotal joint, as at 19.

Suitable means are provided for holding the toggle-links in their dead-central position, and as the links are connected to the rods it will be evident that when the centers of the links are intersected by a dead-center line the connecting member C is in the nature of a continuous structure or device.

The lower toggle member 17 is connected with the upper rod 12, it being pivoted, as at 20, to the lower end of the extension 14, while the upper toggle member 18 is connected with the pump-rod 13, it being pivoted, as at 22, to the extension 15.

In Fig. 1 the toggle-centers 19, 20, and 22 are shown as being on a dead-center line, and it will be evident that upon reciprocation of the rod 12 while the mill or other motor is in motion the full stroke of the motor will be imparted to the pump-rod 13. When, however, the toggle is broken, as happens when the velocity of the wind goes below a predetermined point, the rod 12 will be elevated; but such a motion cannot be imparted to the pump-rod for the reason that the toggle will not permit such an action; but while the rod 13 cannot be elevated it will be evident that the motor or power-rod can be reciprocated back and forth, no matter how low the wind may be, without changing the position of the pump-rod, and thereby taking the weight of said pump-rod, the piston, and the column of water sustained by the piston entirely off the motor.

The toggle members 17 18, as hereinbefore stated, are in the nature of angle members, and the upper one consists of two substantial duplicate plates connected for movement in unison and supporting the pin 25, which projects oppositely beyond the same and has openings to receive the parallel vertical rods 26, having bearings 27, which may consist of hooks at their lower ends to receive the journals or screws 28, projecting oppositely from what normally is shown as the lower toggle member 17. The parallel guide-rods 26 are encircled by the coiled springs 29, the lower ends of which bear against the pin 25, while the upper ends fit against the nuts 30 in threaded engagement with the upper ends of the two guides. By rotating the nuts upon their rods the tension of the springs can be regulated, and these springs serve a dual function, they being adapted at one time to constitute a cushion to receive the shock of the falling or ascending rod, as the case may be, and to also aid in throwing the toggle to their dead-center position when the toggle-breaking device is in its initial or idle position.

In Fig. 2 the toggle is illustrated as flexed or broken and the power or motor rod in its extreme upper position. When the power or motor rod is lowered by the action of the mill, the toggle centers will be thrown toward a vertical center line, this operation being aided by the relieving coiled springs, and it will be concluded when the rod 12 has moved far enough in a downward direction to allow the toggle to close completely, and thus restore the two elements of the connecting member C to their primary or initial position, and such relation will be continued until the toggle is again automatically broken, when the speed of the mill goes below the standard.

The invention involves, broadly, two shiftably-connected members and regulating or governing means coöperative therewith and automatically operable to cause a shifting movement of one of the members relatively to the other, and the regulating means may be of any suitable type, and in the case of the toggle mechanism which unites the two rods or sections of the connecting member C I prefer to employ a toggle-breaker automatically governed by fluid-controlled means.

The toggle-breaker is denoted by B, and it is represented as consisting of a lever carried by the upper rod 12 and represented as fulcrumed, as at 35, to the extension 14, and having a downwardly-projecting arm or tripping device proper, 36, adapted at a certain point to engage the stud 37 upon the lower toggle member 17. The arm 36 is deflected at a point below the toggle-breaking lever, and the main portion of said arm is adapted to come in contact with the carrying-piece 16 when the toggle-breaking arm has reached a certain point, thereby preventing movement of said toggle-breaking lever beyond such point.

The cross-piece 38 of the windmill tower or framework 39 supports the regulating cylinder or receptacle 40, the piston 41 being reciprocative in said cylinder, and the rod of said piston being denoted by 42 and having a weight 43 at its upper end adapted to actuate the toggle-breaking lever or member B, and this weight is connected by the connecting member or chain 44 with the tail of the toggle-breaking lever.

When all the parts are in their lowermost positions, as represented in Fig. 1, and when the connecting member C ascends, the toggle-breaking arm 36 by striking the projection 37 will flex or break the toggle, so that the rod 12 can be elevated, and as the rod ascends it will carry the toggle-breaker therewith until the forward end thereof strikes the stop 45 upon the cross-piece 39 of the framework, and if the wind is blowing at the proper velocity the requisite quick movement will be imparted to the connecting-rod 12, and as said rod moves to its lowermost position the compressed springs 29 by relaxing can throw the toggle members into a dead-center position to couple the rods 12 and 13. When the end of the lever or breaker B strikes the fixed stop 45, said lever is swung about its axis upon the extension 14 and further elevates the weight 43, and consequently raises the piston 41 to its extreme uppermost position, as shown clearly in Fig. 2. If the rod 12 reciprocates at the normal or substantially normal speed it will travel downward much faster than the weight 43, as the movement of the said weight is regulated by the resistance of a fluid of suitable kind in the cylinder 40, and as said weight cannot drop quickly enough the arm 36 cannot resume its primary or toggle-tripping position, as shown in Fig. 1. When, however, the speed of the pump is very slow, the weight 43 can fall, and as it does so it will swing the lever B to its primary position, where the arm 36 can break the toggle.

The piston 41 has a port 45 of comparatively large diameter controlled by the check-valve 46, which is normally held closed by the weight 47.

The cylinder is adapted to contain a body of fluid, such as glycerin, which acts as an effective cushion for automatically governing the descent of the piston 41. When the piston is elevated, a stream of fluid flows through the comparatively large and valve-controlled opening 45, and when the piston is in its topmost position the valve of course is closed by the weight 47, and on the descent of the piston the pressure of the fluid below the same holds said valve closed. When the weight falls, the liquid will flow slowly through a port (not shown) in the pipe 48, the effective area of the port being controlled by the hand-adjustable valve 49 upon the pipe 48, which extends entirely through the piston 41. The descent of the piston is very slow, the resistance, of course, of the fluid to the operation of said piston being controlled by the manipulation of the valve 49. For adjusting the toggle-links to regulate the flow thereof I provide the lower one with a set-screw 60, adapted to engage the companion member 18, thereby to shift the latter relatively to the other member.

In Figs. 1 and 5 I have illustrated a modification of the device wherein the coupling instrumentality which unites the power and pump rods is in the nature of a fluid-governor, including a valve adapted to govern the flow of a column or body of liquid in said governor, and which valve in turn is actuated by mechanism precisely the same as that shown in in Figs. 1 to 4 for controlling the action of the toggle-breaker, and as the regulating mechanism which coöperates with the fluid-governor is the same I shall employ the same characters to denote corresponding parts as in the other views. The two rods 12 and 13 are united by the cylinder 60, having a main compartment 61, in which the piston 62 is disposed, the piston-rod 63 passing through a stuffing-box of suitable type in the upper head of said cylinder 60 and being directly joined to the power-rod 12. The lever B' is fulcrumed to the piston-rod 63, and between the fulcrum and the chain or connecting-piece 44 the link 64 is pivoted, said link being likewise attached to the arm 65 of the valve 66, disposed in the auxiliary chamber or compartment 67 of the cylinder 60. In Fig. 5 the valve 66 is represented as closed and the weight 43 as up and the piston 62 in its extreme lowermost position and in contact with the bottom of the cylinder, the valve 66 at this time being closed.

Let it be assumed that the connecting member C' (represented in Fig. 5) is operating at its normal speed. When, however, this speed goes below the requisite point, the weight 43 drops, shifts the lever B', and through the link 64 operates the arm 65, and consequently the valve 66, to open the said valve, and thereby to permit the ascent of the piston 62, and consequently of the rod 63, independently of the cylinder 60, which remains in a stationary position, and the fluid that is elevated by the ascending piston is forced from the main chamber 61 into the auxiliary chamber 67 and behind the piston. It will be evident that the body of liquid contained within the cylinder C serves as a cushion to receive the shock or jar caused by the shifting of one of the connecting-rods 12 or 13 relatively to the other.

The fluid after passing from the auxiliary chamber 67 of the cylinder C' passes again into the main chamber 61 through the ports 69 in the plunger or piston 62, which ports are normally covered by the disks, as 69', having a central aperture to receive the piston-rod 63.

The apparatus hereinbefore specified is simple in construction and effective in action, it being immediately operative when the wind is light to throw the pump-rod out of action for the time being or until the wind reaches a certain velocity, and when the pump-rod is out of action, of course, it can in no wise affect the operation of the wind-wheel, as this may be turned by a very slight wind.

When a very slight wind is blowing, if the ordinary mill be one of large capacity the latter will immediately stop; but this disadvantage is not present by the employment of my improved power-transmitting member. While said power-transmitting member is of prime importance in connection with a windmill, it is at once apparent that it can be used in any other connection. It is effective in cases where the load varies and the power is constant.

It will be evident that the improved device is in the nature of a connecting member consisting of two rods united by a coupling device which permits one of the rods to be shifted longitudinally of the other, thereby to increase to different distances the length of the connecting member as a whole, this length being governed by the velocity of the wind.

While I have shown herein certain organizations for carrying out the objects of my invention, it is obvious that said invention is not limited in its scope to the particular elements hereinbefore specified nor to the arrangement thereof as set forth, these being capable of material change to suit different conditions.

Having described my invention, what I claim is—

1. A power-transmitting member consisting of two shiftably-united parts, and automatically-operative means for increasing and decreasing the effective length of said power-transmitting member by shifting one of its parts relatively to the other.

2. A power-transmitting member consisting of two shiftably-connected members, and automatically-operative means for causing one of said members to shift longitudinally of its companion at a predetermined point.

3. A power-transmitting member consisting of two members, a device connecting said members whereby one of them can shift relatively and longitudinally to the other, and means for governing the action of said device.

4. A power-transmitting member consisting of two members, a toggle uniting said members, and means for automatically causing one of said members to shift relatively to the other.

5. A power-transmitting member consisting of two shiftably-connected members, a toggle uniting said members, and means located to break said toggle when the speed of one of the members passes a certain point, thereby to permit a shifting movement of one member relatively to the other.

6. A power-transmitting member consisting of two shiftably-connected members, means automatically operative to cause one of said members to shift relatively to the other, and a cushion device active to relieve the shock when the shiftable member is operative relatively to its companion.

7. A power-transmitting member consisting of two shiftably-united parts, and means for causing one of said parts to automatically move relatively to the other part in the direction of the stroke of said power-transmitting member.

8. A power-transmitting member consisting of two shiftably-connected parts, and means for effecting the shifting movement of one of said members located relatively to its companion, said means including the following instrumentalities: a weight, a fluid-controlling cylinder, and a piston in said cylinder connected with the weight.

9. A power-transmitting member consisting of two members, a toggle uniting said members, a toggle-breaker automatically operative, and means acting in opposition to said toggle-breaker to throw the toggle members into a dead-center position.

10. A power-transmitting member consisting of two members, a toggle uniting said members, a toggle-breaker automatically operative, and a spring acting against the spring members to throw the toggle members into a dead-center position.

11. A power-transmitting member consisting of two shiftably-connected members, a lever adapted to break the connection between said members, whereby one of them can be shifted relatively to its companion, a lever mounted upon one of the members, a stop located in the path of the lever, and a shifting device connected to said lever.

12. A power-transmitting member consisting of two members, a toggle uniting said members, a toggle-breaker mounted upon one of the members, a weight connected to the toggle-lever, a cylinder containing a piston, and a rod connected respectively with the cylinder and with the weight.

13. A power-transmitting member consisting of two members, a toggle connecting said members, a toggle-breaker, means for governing the action of the toggle-breaker, a pin carried by one of the toggle members and having apertures, a pair of rods passing through said apertures, a journal upon the toggle member supporting said rods, and springs on the rods.

In testimony whereof I have signed my name to this specification in the presence of two subscribing witnesses.

FREDERIC W. BLANCHARD.

Witnesses:
HEATH SUTHERLAND,
ADOLF C. KAISER.